(12) United States Patent
Song

(10) Patent No.: US 9,432,085 B2
(45) Date of Patent: Aug. 30, 2016

(54) METHOD FOR RECOGNIZING MOVEMENT TRAJECTORY OF OPERATOR, MICROCONTROLLER AND ELECTRONIC DEVICE

(71) Applicants: Beijing Lenovo Software Ltd., Beijing (CN); Lenovo (Beijing) Co., Ltd., Beijing (CN)

(72) Inventor: Jianhua Song, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/581,298

(22) Filed: Dec. 23, 2014

(65) Prior Publication Data

US 2016/0036496 A1    Feb. 4, 2016

(30) Foreign Application Priority Data

Jul. 30, 2014    (CN) .......................... 2014 1 0368304

(51) Int. Cl.
   *H04B 5/00*    (2006.01)
(52) U.S. Cl.
   CPC .......... *H04B 5/0012* (2013.01); *H04B 5/0043* (2013.01)
(58) Field of Classification Search
   CPC ........................... H04B 5/0012; H04B 5/0043
   USPC ..................................... 455/41.1, 41.2, 41.3
   See application file for complete search history.

(56) References Cited

U.S. PATENT DOCUMENTS

| | | | | | |
|---|---|---|---|---|---|
| 2009/0295676 | A1* | 12/2009 | Yamazaki | ............ | H01Q 1/3233 343/876 |
| 2010/0207911 | A1* | 8/2010 | Newton | ................ | G06F 3/0428 345/175 |
| 2012/0007713 | A1* | 1/2012 | Nasiri | ................... | G06F 1/1694 340/5.81 |
| 2012/0044199 | A1* | 2/2012 | Karpin | .................. | G06F 3/0416 345/174 |
| 2012/0295661 | A1* | 11/2012 | Kim | ......................... | G06F 3/017 455/556.1 |
| 2012/0309350 | A1* | 12/2012 | Kim | ......................... | H04W 8/16 455/411 |
| 2013/0106702 | A1* | 5/2013 | Chen | ..................... | G06F 3/0416 345/168 |
| 2013/0165045 | A1* | 6/2013 | Cao | ........................ | H04W 4/206 455/41.2 |
| 2014/0191998 | A1* | 7/2014 | Chuang | ................... | G06F 3/017 345/173 |
| 2014/0292306 | A1* | 10/2014 | Prance | .................. | G01V 3/088 324/123 R |
| 2014/0354536 | A1* | 12/2014 | Kim | ......................... | G06F 3/017 345/156 |
| 2015/0271646 | A1* | 9/2015 | Chang | ..................... | H04W 4/04 455/457 |
| 2016/0036496 | A1* | 2/2016 | Song | .................... | H04B 5/0043 455/41.1 |

* cited by examiner

*Primary Examiner* — Md Talukder

(74) *Attorney, Agent, or Firm* — Harness, Dickey & Pierce, P.L.C.

(57) ABSTRACT

A method for recognizing a movement trajectory of an operator, a microcontroller and an electronic device are provided. The method is applied to an electronic device provided with an antenna and a sensor, and the antenna is connected to the sensor and is in a first operation mode. The method includes: obtaining a capacitance signal which is generated by the antenna in the first operation mode during a first time period and is collected by the sensor; generating data of a distance between the operator and the antenna during the first time period according to the capacitance signal; and analyzing the data of the distance and obtaining the movement trajectory of the operator formed during the first time period.

6 Claims, 8 Drawing Sheets

METHOD FOR RECOGNIZING MOVEMENT TRAJECTORY OF OPERATOR, MICROCONTROLLER AND ELECTRONIC DEVICE

CROSS-REFERENCE TO RELATED APPLICATIONS

This application claims priority to Chinese Patent Application No. 201410368304.3, entitled "METHOD FOR RECOGNIZING MOVEMENT TRAJECTORY OF OPERATOR, MICROCONTROLLER AND ELECTRONIC DEVICE", filed with the Chinese State Intellectual Property Office on Jul. 30, 2014, which is incorporated by reference in its entirety herein.

FIELD

The disclosure relates to the technical field of data processing, and in particular to a method for recognizing a movement trajectory of an operator, a microcontroller and an electronic device.

BACKGROUND

Conventionally, in operations of an electronic device, a camera or an additional sensor is usually used to implement functions such as recognizing a movement trajectory of an operator. However, such recognition results in a high power consumption.

SUMMARY

A method for recognizing a movement trajectory of an operator is provided according to the disclosure. The method is applied to an electronic device provided with an antenna and a sensor, the antenna is connected to the sensor and is in a first operation mode. The method includes: obtaining a capacitance signal which is generated by the antenna in the first operation mode during a first time period and is collected by the sensor; generating data of a distance between the operator and the antenna during the first time period according to the capacitance signal; and analyzing the data of the distance and obtaining the movement trajectory of the operator formed during the first time period.

A microcontroller is further provided according to the disclosure. The microcontroller is arranged in an electronic device, the electronic device includes an antenna and a sensor, and the antenna is connected to the sensor and is in a first operation mode. The microcontroller includes: a signal obtaining module, configured to obtain a capacitance signal which is generated by the antenna in the first operation mode during a first time period and is collected by the sensor; a data generating module, configured to generate data of a distance between an operator and the antenna during the first time period according to the capacitance signal; and a data analyzing module, configured to analyze the data of the distance and obtain a movement trajectory of the operator formed during the first time period.

An electronic device is further provided according to the disclosure. The electronic device includes an antenna, a sensor and a microcontroller, the sensor is arranged on an upper region of a display screen of the electronic device or on a hinge region of the electronic device, where the antenna is configured to generate a capacitance signal if an operator is in a search range of the antenna in a case that the antenna is in a first operation mode; the sensor is configured to collect the capacitance signal generated by the antenna in the first operation mode during a first time period; and the microcontroller is configured to obtain the capacitance signal collected by the sensor, generate data of a distance between the operator and the antenna during the first time period according to the capacitance signal, analyze the data of the distance and obtain a movement trajectory of the operator formed during the first time period.

It can be known from the foregoing solutions that in the method for recognizing the movement trajectory of the operator, the microcontroller and the electronic device according to the disclosure, an antenna in a first operation mode and a sensor connected to the antenna are arranged in the electronic device, the antenna generates capacitance signals due to approach and movement of an operator when the operator moves near the antenna, and the sensor collects the capacitance signals. Therefore, in the disclosure, the capacitance signals collected by the sensor are obtained, and data of distances between the operator and the antenna during a first time period is generated according to the capacitance signals and then analyzed, to obtain the movement trajectory of the operator formed during the first time period. In the disclosure, by arranging the sensor and the antenna in combination, rather than by using the device such as the camera as in the conventional method, high power consumption caused by recognizing the movement trajectory of the operator through image recognition is avoided and thus power consumption of the electronic device is reduced.

BRIEF DESCRIPTION OF THE DRAWINGS

To describe the technical solutions of embodiments of the disclosure more clearly, drawings involved in the embodiments of the disclosure are described briefly below. Apparently, the drawings described below are some embodiments of the application, and persons of ordinary skill in the art can derive other drawings according to the drawings without any creative effort.

DETAILED DESCRIPTION OF THE EMBODIMENTS

Technical solutions of the embodiments of the disclosure will be illustrated clearly below with the drawings of the embodiments of the disclosure. Apparently, the described embodiments are merely a few rather than all of the embodiments of the disclosure. All other embodiments obtained by persons of ordinary skill in the art based on the embodiment of the disclosure without creative efforts shall fall within the protection scope of the application.

Figure 1:
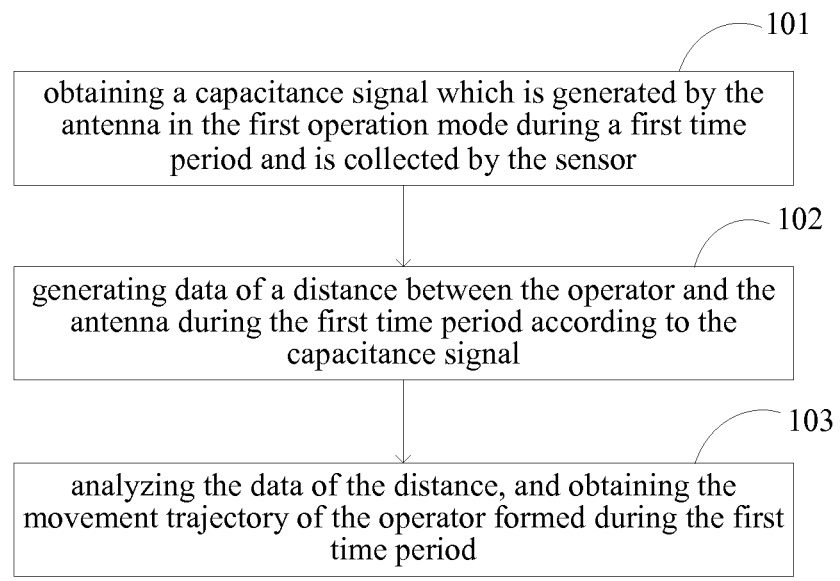
FIG. 1 is a flow chart of a method for recognizing a movement trajectory of an operator according to a first embodiment of the disclosure.
Figure 2A:
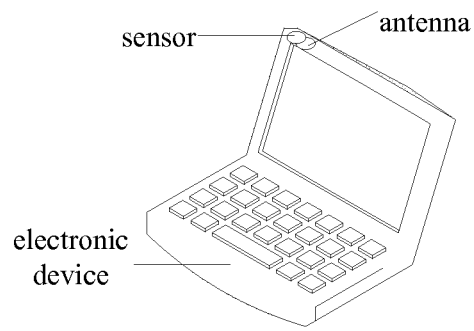
FIG. 2a, FIG. 2b and FIG. 3 are diagrams of exemplary applications according to embodiments of the disclosure.
Figure 2B:
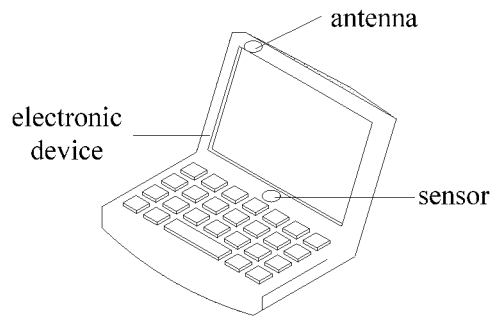

FIG. 1 is a flow chart of a method for recognizing a movement trajectory of an operator according to a first embodiment of the disclosure. The method is applied to an electronic device. The electronic device may be a device provided with an antenna and a sensor, such as a cellphone, a pad, a laptop or an all-in-one device. The antenna is connected to the sensor. Taking the laptop as an example, the antenna may be arranged on the top left corner or top right corner of a display screen of the laptop; and the sensor may be arranged on a region near the antenna, i.e., the top left corner or top right corner of the display screen, or may be arranged inside a hinge of the laptop, as shown in FIG. 2a and FIG. 2b.

It should be noted that, the antenna being in a first operation mode refers to that the antenna receives and transmits signal data at a transmission power corresponding to the first operation mode.

To recognize a movement trajectory of an operator, the method according to the embodiment may include following steps 101 to 103.

Step 101 includes: obtaining a capacitance signal which is generated by the antenna in the first operation mode during a first time period and is collected by the sensor.

Figure 3:
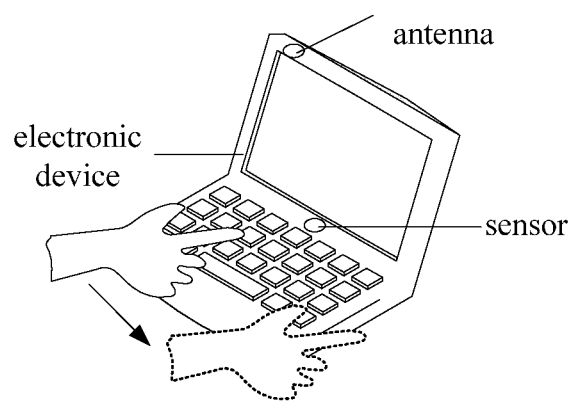

The capacitance signal includes different capacitance signals generated by the antenna due to movement of the operator (the operator moves closer to or moves away from the antenna in a certain direction, as shown in FIG. 3) when the operator moves near the antenna. The sensor collects the capacitance signal generated by the antenna due to the movement of the operator, and the capacitance signal collected by the sensor is obtained in the embodiment of the disclosure.

Step 102 includes: generating data of a distance between the operator and the antenna during the first time period according to the capacitance signal.

It can be known from the above that the capacitance signal is generated by the antenna since the operator moves closer to or moves away from the antenna. Therefore, for a certain position where the operator is located, the antenna generates a unique capacitance signal corresponding to the position. In view of the above, in step 102, according to the capacitance signal, i.e., according to a capacitance changing signal generated by the antenna during the first time period since the operator moves near the antenna, the data of the distance between the operator and the antenna during the first time period is generated.

Step 103 includes: analyzing the data of the distance and obtaining the movement trajectory of the operator formed during the first time period.

In step 103, position of the operator relative to the antenna at each moment in the first time period is obtained by analyzing the distance between the operator and the antenna during the first time period which is indicated by the data of the distance, thereby obtaining the movement trajectory of the operator formed during the first time period, such as operator trajectory of moving left or moving right or moving forward or moving backward or moving rotationally with respect to the electronic device.

It can be known from the foregoing solution that, in the method for recognizing the movement trajectory of the operator according to the first embodiment of the disclosure, an antenna in a first operation mode and a sensor connected to the antenna are arranged in the electronic device, the antenna generates capacitance signals due to approach and movement of an operator when the operator moves near the antenna, and the sensor collects the capacitance signals. Therefore, in the disclosure, the capacitance signals collected by the sensor are obtained, and data of distances between the operator and the antenna during a first time period is generated according to the capacitance signals and then analyzed, to obtain the movement trajectory of the operator formed during the first time period. In the disclosure, by arranging the sensor and the antenna in combination, rather than by using the device such as the camera as in the conventional method, high power consumption caused by recognizing the movement trajectory of the operator through image recognition is avoided and thus power consumption of the electronic device is reduced.

Figure 4:
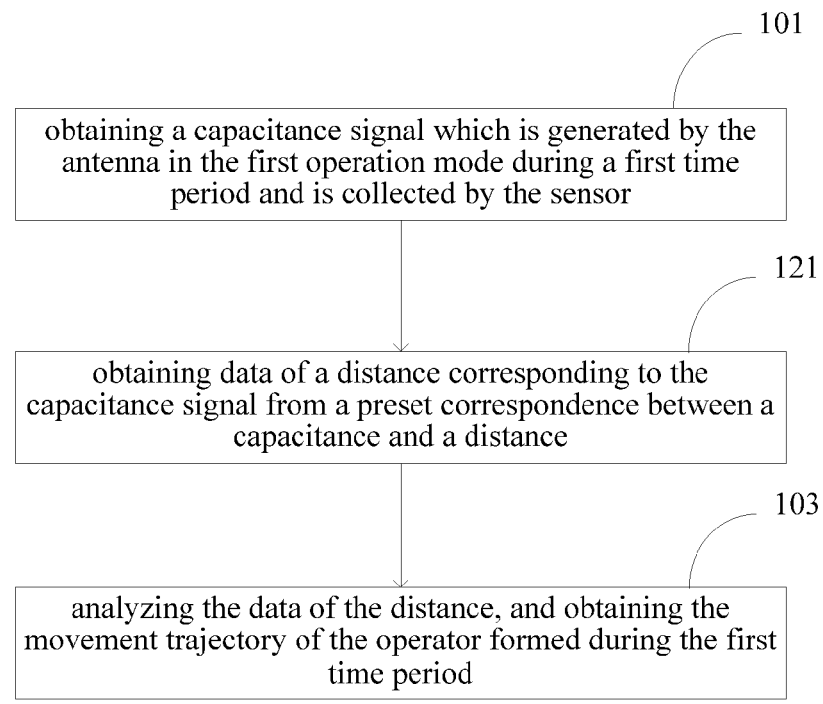
FIG. 4 is a flow chart of a method for recognizing a movement trajectory of an operator according to a second embodiment of the disclosure.

FIG. 4 is a flow chart of a method for recognizing a movement trajectory of an operation body according to a second embodiment of the disclosure. The method of the second embodiment differs from the method of the first embodiment in that, step 102 in the method of the first embodiment is implemented through following step 121.

Step 121 includes: obtaining the data of the distance corresponding to the capacitance signal from a preset correspondence between a capacitance and a distance.

The data of the distance includes data of a distance between the operator and the antenna at any moment in the first time period.

Figure 5:
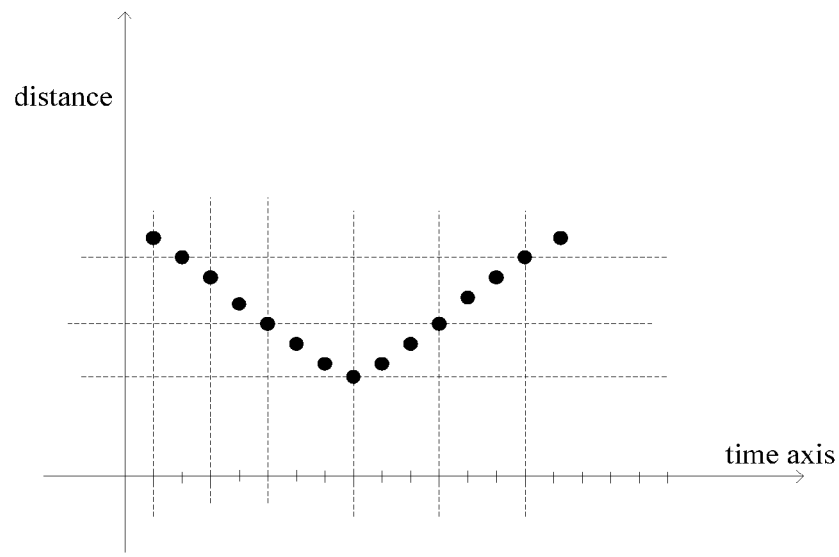
FIG. 5 is a diagram of another exemplary application according to an embodiment of the disclosure.

That is, for any position in any direction where the operator is located relative to the antenna, the antenna in the first operation mode has a capacitance value which corresponds to a distance corresponding to the position. Therefore, a correspondence between a capacitance and a distance may be preset for the antenna in the first operation mode. The correspondence includes multiple values of distances and values of capacitance signals which are generated by the antenna and correspond to the values of the distances, and the values of the distances are values of distances between the operator and the antenna. Therefore, the data of the distance may be represented in a coordinate system in which X axis represents time and Y axis represents distance, as shown in FIG. 5.

Figure 6:
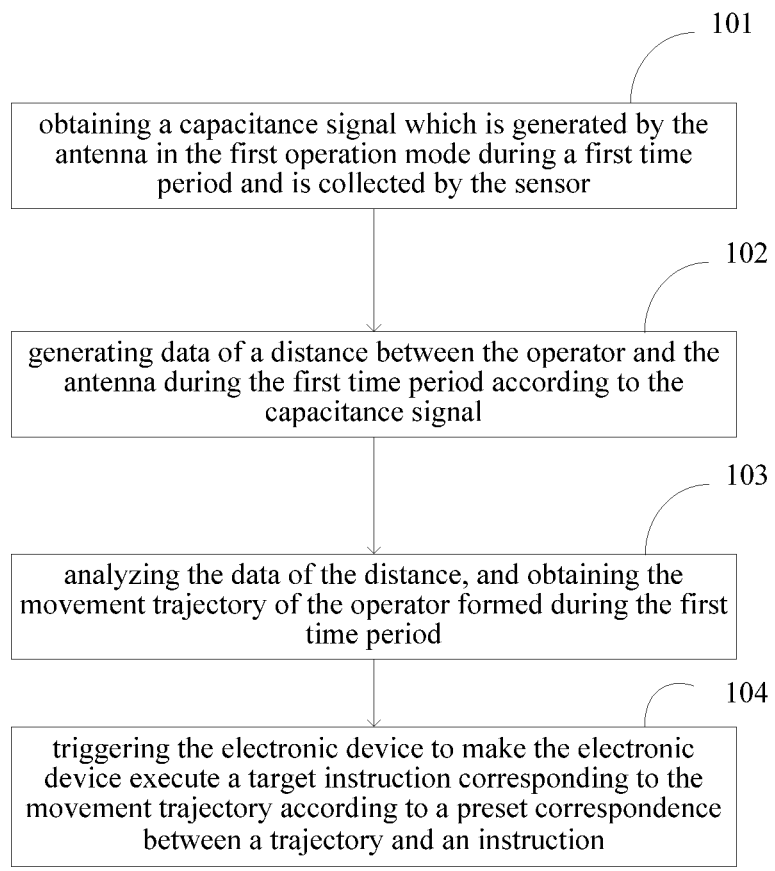
FIG. 6 is a flow chart of a method for recognizing a movement trajectory of an operator according to a third embodiment of the disclosure.

FIG. 6 is a flow chart of a method for recognizing a movement trajectory of an operator according to a third embodiment of the disclosure. The method of the third embodiment differs from the method of the first embodiment in that, after step 103 of the method of the first embodiment, the method of the third embodiment further includes following step 104.

Step 104 includes: triggering the electronic device to make the electronic device execute a target instruction corresponding to the movement trajectory according to a preset correspondence between a trajectory and an instruction.

The electronic device is connected to a device which performs the embodiment. Once the movement trajectory of the operator is obtained, the movement trajectory may be transmitted to the electronic device, to trigger the electronic device to make it find a target instruction corresponding to the movement trajectory from the correspondence between the trajectory and the instruction, and the electronic device then executes the target instruction.

It should be noted that, the correspondence between the trajectory and the instruction is preset in the electronic device. The correspondence between the trajectory and the instruction may refer to that each movement trajectory of the operator with respect to the antenna, i.e., with respect to the electronic device corresponds to an instruction. For example, if the operator moves right relative to the antenna, the electronic device in a video playing state executes an instruction of fast forwarding the video by 5 seconds which corresponds to the movement trajectory of the operator.

Figure 7:
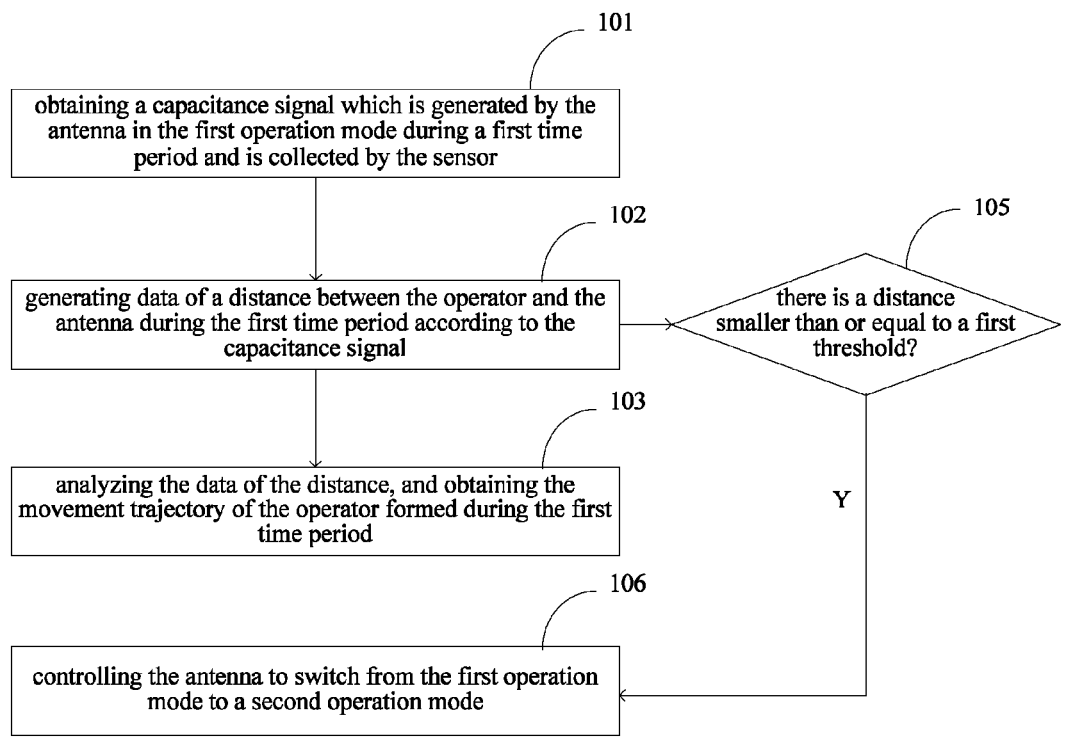
FIG. 7 is a flow chart of a method for recognizing a movement trajectory of an operator according to a fourth embodiment of the disclosure.

FIG. 7 is a flow chart of a method for recognizing a movement trajectory of an operator according to a fourth embodiment of the disclosure. The method of the fourth embodiment differs from the method of the first embodiment in that, after step 102 of the method of the first embodiment, the method of the fourth embodiment further includes following steps 105 to 106.

Step 105 includes: determining whether the data of the distance includes data of a distance smaller than or equal to a preset first threshold, and performing step 106 if the data of the distance includes data of a distance smaller than or equal to the preset first threshold.

According to the embodiment, the distance between the operator and the antenna is monitored, and in a case that the distance between the operator and the antenna is smaller than the first threshold, step 106 is performed.

It should be noted that the first threshold may be preset by a user, and the first threshold may be set with reference to the specific absorption rate (SAR) certification requirement.

Step 106 includes: controlling the antenna to switch from the first operation mode to a second operation mode.

Transmission power of the antenna in the second operation mode is smaller than that of the antenna in the first operation mode.

According to the embodiment, the first operation mode may be a mode in which the movement trajectory of the operator can be recognized, and the second operation mode may be a mode for detecting the operator in a case that the operator is close to the antenna. In step 106, the antenna is controlled to switch to the second operation mode in which gain of a radio frequency amplifier of the antenna is reduced, i.e., radio-frequency power of the antenna is reduced, to meet the SAR certification requirement.

Figure 8:
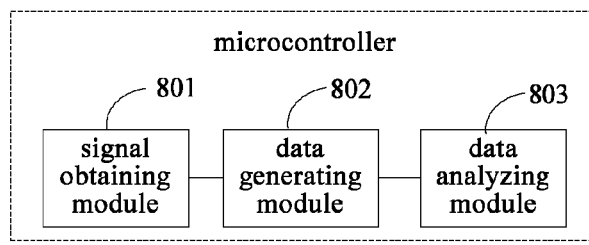
FIG. 8 is a schematic structural diagram of a microcontroller according to a fifth embodiment of the disclosure.

FIG. 8 is a schematic structural diagram of a microcontroller according to a fifth embodiment of the disclosure. The microcontroller is arranged in an electronic device. The electronic device may be a device provided with an antenna and a sensor, such as a cellphone, a pad, a laptop or an all-in-one device. The antenna is connected to the sensor. Taking the laptop as an example, the antenna may be arranged on the top left corner or top right corner of a display screen of the laptop; and the sensor may be arranged on a region near the antenna, i.e., the top left corner or top right corner of the display screen, or may be arranged inside a hinge of the laptop, as shown in FIG. 2a and FIG. 2b.

It should be noted that, the antenna being in a first operation mode refers to that the antenna receives and transmits signal data at a transmission power corresponding to the first operation mode.

The microcontroller according to the embodiment may include a signal obtaining module 801, a data generating module 802 and a data analyzing module 803.

The signal obtaining module 801 is configured to obtain a capacitance signal which is generated by the antenna in a first operation mode during a first time period and is collected by the sensor.

The capacitance signal includes different capacitance signals generated by the antenna due to movement of the operator (the operator moves closer to or moves away from the antenna in a certain direction, as shown in FIG. 3) when the operator moves near the antenna. The sensor collects the capacitance signal generated by the antenna due to the movement of the operator, and the capacitance signal collected by the sensor is obtained in the embodiment of the disclosure.

The data generating module 802 is configured to generate data of a distance between the operator and the antenna during the first time period according to the capacitance signal.

It can be known from the above that the capacitance signal is generated by the antenna since the operator moves closer to or moves away from the antenna. Therefore, for a certain position where the operator is located, the antenna generates a unique capacitance signal corresponding to the position. In view of the above, in the data generating module 802, according to the capacitance signal, i.e., according to a capacitance changing signal generated by the antenna during the first time period since the operator moves near the antenna, the data of the distance between the operator and the antenna during the first time period is generated.

The data analyzing module 803 is configured to analyze the data of the distance and obtain the movement trajectory of the operator formed during the first time period.

In the data analyzing module 803, position of the operator relative to the antenna at each moment in the first time period is obtained by analyzing the distance between the operator and the antenna during the first time period which is indicated by the data of the distance, thereby obtaining the movement trajectory of the operator formed during the first time period, such as operator trajectory of moving left or moving right or moving forward or moving backward or moving rotationally with respect to the electronic device.

It can be known from the foregoing solution that, with the microcontroller according to the fifth embodiment of the disclosure, an antenna in a first operation mode and a sensor connected to the antenna are arranged in the electronic device, the antenna generates capacitance signals due to approach and movement of an operator when the operator moves near the antenna, and the sensor collects the capacitance signals. Therefore, in the disclosure, the capacitance signals collected by the sensor are obtained, and data of distances between the operator and the antenna during a first time period is generated according to the capacitance signals and then analyzed, to obtain the movement trajectory of the operator formed during the first time period. In the disclosure, by arranging the sensor and the antenna in combination, rather than by using the device such as the camera as in the conventional method, high power consumption caused by recognizing the movement trajectory of the operator through image recognition is avoided and thus power consumption of the electronic device is reduced.

Figure 9:
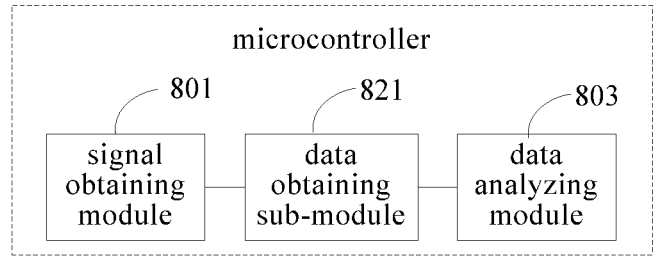
FIG. 9 is a schematic structural diagram of a microcontroller according to a sixth embodiment of the disclosure.

FIG. 9 is a schematic structural diagram of a microcontroller according to a sixth embodiment of the disclosure. The microcontroller of the sixth embodiment differs from the microcontroller of the fifth embodiment in that, the data generating module 802 in the fifth embodiment is implemented as a data obtaining sub-module 821.

The data obtaining sub-module 821 is configured to obtain the data of the distance corresponding to the capacitance signal in a preset correspondence between a capacitance and a distance.

The data of the distance includes data of a distance between the operator and the antenna at any moment in the first time period.

That is, for any position in any direction where the operator is located relative to the antenna, the antenna in the first operation mode has a capacitance value which corresponds to a distance corresponding to the position. Therefore, a correspondence between a capacitance and a distance may be preset for the antenna in the first operation mode. The correspondence includes multiple values of distances and values of capacitance signals which are generated by the antenna and correspond to the values of the distances, and the values of the distances are values of distances between the operator and the antenna. Therefore, the data of the distance may be represented in a coordinate system in which X axis represents time and Y axis represents distance, as shown in FIG. 5.

Figure 10:
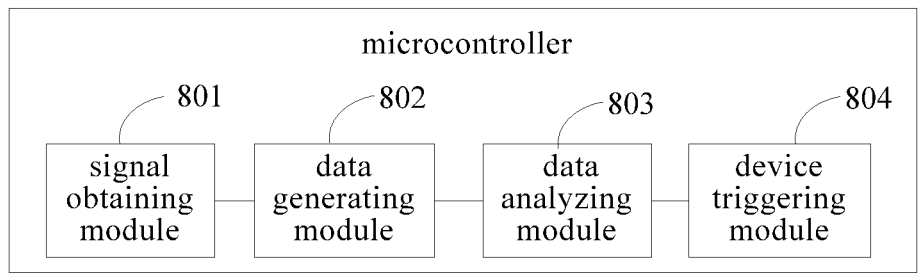
FIG. 10 is a schematic structural diagram of a microcontroller according to a seventh embodiment of the disclosure.

FIG. 10 is a schematic structural diagram of a microcontroller according to a seventh embodiment of the disclosure. The microcontroller of the seventh embodiment differs from the microcontroller of the fifth embodiment in that, the microcontroller further includes a device triggering module 804.

The device triggering module 804 is configured to trigger the electronic device to make the electronic device execute a target instruction corresponding to the movement trajectory according to a preset correspondence between a trajectory and an instruction, after the data analyzing module 803 obtains the movement trajectory of the operator formed during the first time period.

A control chip such as a central processing unit (CPU) of the electronic device is connected to the microcontroller of the embodiment. The microcontroller of the embodiment transmits the movement trajectory of the operator to the electronic device after obtaining the movement trajectory, to trigger the CPU of the electronic device to make it find a target instruction corresponding to the movement trajectory from the correspondence between the trajectory and the instruction, and the CPU then executes the target instruction.

It should be noted that, the correspondence between the trajectory and the instruction is preset in the electronic device. The correspondence between the trajectory and the instruction may refer to that each movement trajectory of the operator with respect to the antenna, i.e., with respect to the electronic device corresponds to an instruction. For example, if the operator moves right relative to the antenna, the electronic device in a video playing state executes an instruction of fast forwarding the video by 5 seconds which corresponds to the movement trajectory of the operator.

Figure 11:
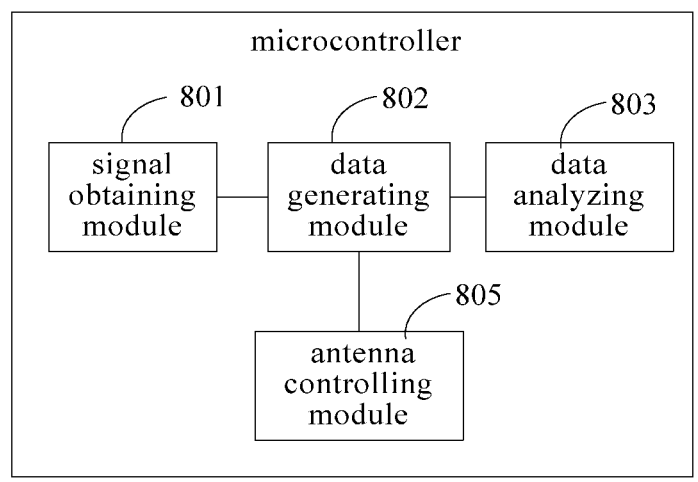
FIG. 11 is a schematic structural diagram of a microcontroller according to a eighth embodiment of the disclosure.

FIG. 11 is a schematic structural diagram of a microcontroller according to an eighth embodiment of the disclosure. The microcontroller of the eighth embodiment differs from the microcontroller of the fifth embodiment in that, the microcontroller further includes an antenna controlling module 805.

The antenna controlling module 805 is configured to, after the data generating module 802 generates the data of the distance between the operator and the antenna during the first time period according to the capacitance signal, control the antenna to switch from the first operation mode to a second operation mode in a case that the data of the distance includes data of a distance smaller than or equal to a first threshold.

Transmission power of the antenna in the second operation mode is smaller than that of the antenna in the first operation mode.

It should be noted that the first threshold may be preset by a user, and the first threshold may be set with reference to the SAR certification requirement.

According to the embodiment, the antenna controlling module 805 monitors the distance between the operator and the antenna and controls the antenna to switch from the first operation mode to the second operation mode in a case that the distance between the operator and the antenna is smaller than the first threshold. According to the embodiment, the first operation mode may be a mode in which the movement trajectory of the operator can be recognized, and the second operation mode may be a mode for detecting the operator in a case that the operator is close to the antenna. In the antenna controlling module 805, the antenna is controlled to switch to the second operation mode in which gain of a radio frequency amplifier of the antenna is reduced, i.e., radio-frequency power of the antenna is reduced, to meet the SAR certification requirement.

Figure 12:
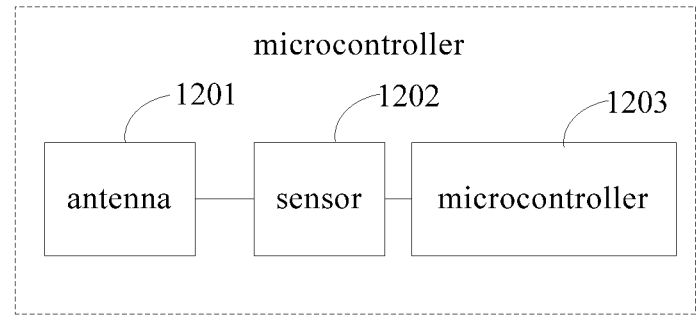
FIG. 12 is a schematic structural diagram of an electronic device according to a ninth embodiment of the disclosure.

FIG. 12 is a schematic structural diagram of an electronic device according to a ninth embodiment of the disclosure. The electronic device may include an antenna 1201, a sensor 1202 and a microcontroller 1203. The sensor 1202 is arranged on an upper region of a display screen of the electronic device or on a hinge region of the electronic device. The electronic device may be a cellphone, a pad, a laptop or an all-in-one device.

The antenna 1201 is configured to generate a capacitance signal if an operator is in a search range of the antenna in a case that the antenna is in a first operation mode.

It should be noted that, the antenna being in a first operation mode refers to that the antenna receives and transmits signal data at a transmission power corresponding to the first operation mode.

The capacitance signal includes different capacitance signals generated by the antenna due to movement of the operator (the operator moves closer to or moves away from the antenna in a certain direction, as shown in FIG. 3) when the operator moves near the antenna. The sensor collects the capacitance signal generated by the antenna due to the movement of the operator, and the capacitance signal collected by the sensor is obtained according to the embodiment of the disclosure.

The sensor 1202 is configured to collect the capacitance signal generated by the antenna 1201 in the first operation mode during a first time period.

The microcontroller 1203 is configured to obtain the capacitance signal collected by the sensor 1202, generate data of a distance between the operator and the antenna during the first time period according to the capacitance signal, analyze the data of the distance and obtain a movement trajectory of the operator formed during the first time period.

It can be known from the above that the capacitance signal is generated by the antenna since the operator moves closer to or moves away from the antenna. Therefore, for a certain position where the operator is located, the antenna generates a unique capacitance signal corresponding to the position. In view of the above, the microcontroller 1203 obtains the capacitance signal, and then generates the data of the distance between the operator and the antenna during the first time period according to the capacitance signal, i.e., according to a capacitance changing signal generated by the antenna during the first time period since the operator moves near the antenna. The microcontroller 1203 further analyzes the distance between the operator and the antenna during the first time period which is indicated by the data of the distance, to obtain position of the operator relative to the antenna at each moment in the first time period and thus the movement trajectory of the operator formed during the first time period, such as operator trajectory of moving left or moving right or moving forward or moving backward or moving rotationally with respect to the electronic device.

It can be known from the foregoing solution that, with the electronic device according to the ninth embodiment of the disclosure, an antenna in a first operation mode and a sensor connected to the antenna and a microcontroller connected to the sensor are arranged in the electronic device, the antenna generates capacitance signals due to approach and movement of an operator when the operator moves near the antenna, and the sensor collects the capacitance signals. Therefore, the microcontroller obtains the capacitance signals collected by the sensor, generates data of distances between the operator and the antenna during a first time period according to the capacitance signals and then analyzes the data of the distances to obtain the movement trajectory of the operator formed during the first time period. In the disclosure, by arranging the sensor and the antenna in combination, rather than by using the device such as the camera as in the conventional method, high power consumption caused by recognizing the movement trajectory of the operator through image recognition is avoided and thus power consumption of the electronic device is reduced.

Figure 13:
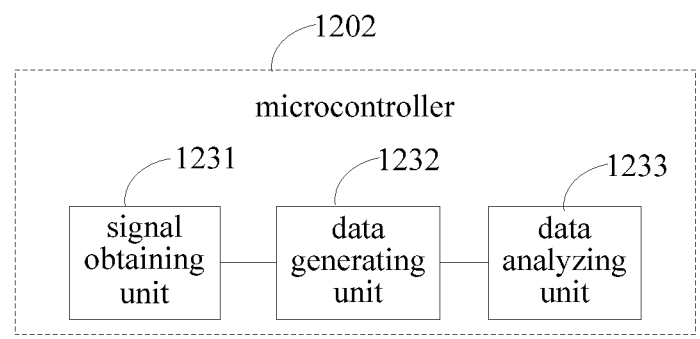
FIG. 13 is a schematic structural diagram of a microcontroller 1203 of an electronic device according to a tenth embodiment of the disclosure.

FIG. 13 is a schematic structural diagram of a microcontroller 1203 of an electronic device according to a tenth embodiment of the disclosure. The electronic device of the tenth embodiment differs from the electronic device of the ninth embodiment in that, the microcontroller 1203 of the electronic device includes a signal obtaining unit 1231, a data generating unit 1232 and a data analyzing unit 1233.

The signal obtaining unit 1231 is configured to obtain a capacitance signal collected by the sensor.

The data generating unit 1232 is configured to obtain data of a distance corresponding to the capacitance signal from a preset correspondence between a capacitance and a distance, where the data of the distance includes data of a distance between the operator and the antenna at any moment in the first time period.

That is, for any position in any direction where the operator is located relative to the antenna, the antenna in the first operation mode has a capacitance value which corresponds to a distance corresponding to the position. Therefore, a correspondence between a capacitance and a distance may be preset for the antenna in the first operation mode. The correspondence includes multiple values of distances and values of capacitance signals which are generated by the antenna and correspond to the values of the distances, and the values of the distances are values of distances between the operator and the antenna. Therefore, the data of the distance may be represented in a coordinate system in which X axis represents time and Y axis represents distance, as shown in FIG. 5.

The data analyzing unit 1233 is configured to analyze the data of the distance and obtain a movement trajectory of the operator formed during the first time period.

Based on the foregoing embodiments of the electronic device, the microcontroller 1203 may be further configured to, after obtaining the movement trajectory of the operator formed during the first time period, trigger the electronic device to make the electronic device execute a target instruction corresponding to the movement trajectory according to a preset correspondence between a trajectory and an instruction.

Figure 14:
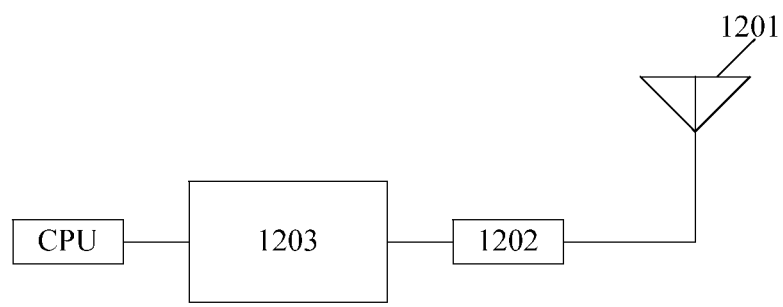
FIG. 14 and FIG. 15 are diagrams of other exemplary applications according to embodiments of the disclosure.

As shown in FIG. 14, a control chip such as a CPU of the electronic device is connected to the microcontroller 1203. The microcontroller 1203 transmits the movement trajectory of the operator to the electronic device after obtaining the movement trajectory, to trigger the CPU of the electronic device to make it find a target instruction corresponding to the movement trajectory from the correspondence between the trajectory and the instruction, and the CPU then executes the target instruction.

It should be noted that, the correspondence between the trajectory and the instruction is preset in the electronic device. The correspondence between the trajectory and the instruction may refer to that each movement trajectory of the operator with respect to the antenna, i.e., with respect to the electronic device corresponds to an instruction. For example, if the operator moves right relative to the antenna, the electronic device in a video playing state executes an instruction of fast forwarding the video by 5 seconds which corresponds to the movement trajectory of the operator.

In addition, the microcontroller 1203 may be further configured to control the antenna 1201 to switch from the first operation mode to the second operation mode in a case that the data of the distance includes data of a distance smaller than or equal to a first threshold, where transmission power of the antenna 1201 in the second operation mode is smaller than that of the antenna 1201 in the first operation mode.

It should be noted that the first threshold may be preset by a user, and the first threshold may be set with reference to the SAR certification requirement.

Figure 15:
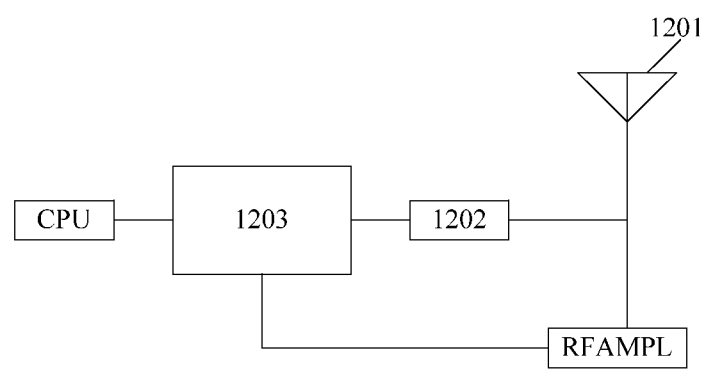

According to the embodiment, the microcontroller 1203 monitors the distance between the operator and the antenna 1201 and controls the antenna 1201 to switch from the first operation mode to the second operation mode in a case that the distance between the operator and the antenna 1201 is smaller than the first threshold. According to the embodiment, the first operation mode may be a mode in which the movement trajectory of the operator can be recognized, and the second operation mode may be a mode for detecting the operator in a case that the operator is close to the antenna. The microcontroller 1203 triggers the antenna 1201, to switch the operation mode of the antenna to the second operation mode in which gain of a radio frequency amplifier (RFAMPL) of the antenna 1201 is reduced, i.e., radio-frequency power of the antenna is reduced, to meet the SAR certification requirement, as shown in FIG. 15.

It should be noted that the embodiments of the disclosure are described in a progressive manner, and each embodiment places emphasis on the difference from other embodiments, therefore, one embodiment can refer to other embodiments for the same or similar parts.

It should also be noted that relationship terms such as "the first" and "the second" herein are only used to distinguish one entity or operation from another entity or operation, and does not necessarily require or imply that there is an actual relationship or sequence between these entities or operations. Furthermore, terms "include", "comprise" or any other variations are intended to cover non-exclusive "include", so that a process, a method, an object or a device including a series of factors not only include these factors, but also include other factors not explicitly listed, or also include inherent factors of the process, the method, the object or the device. Without more limitation, a factor defined in a sentence "include a . . . " does not exclude a case that there is also another same factor in the process, the method, the object or the device including the described factor.

A method for recognizing a movement trajectory of an operator, a microcontroller and an electronic device provided according to the disclosure are described in details. The principle and embodiments of the disclosure are illustrated through using specific cases, and the illustration of the embodiments is only to help understanding the method and the core idea of the disclosure. In addition, for those skilled in the art, some modifications may be made on the embodiments and the application scope based on the spirit of the disclosure. In conclusion, the content in the specification should not be understood as a limitation to the disclosure.

The invention claimed is:

1. A method for recognizing a movement trajectory of an operator, wherein the method is applied to an electronic device provided with an antenna and a sensor, the antenna is connected to the sensor and is in a first operation mode, and the method comprises:

obtaining a capacitance signal which is generated by the antenna in the first operation mode during a first time period and is collected by the sensor;

generating data of a distance between the operator and the antenna during the first time period according to the capacitance signal; and analyzing the data of the distance, and obtaining the movement trajectory of the operator formed during the first time period; and triggering the electronic device to make the electronic device execute a target instruction corresponding to the movement trajectory according to a preset correspondence between a trajectory and an instruction after obtaining the movement trajectory of the operator formed during the first time period, wherein the method further comprises: after generating the data of the distance between the operator and the antenna during the first time period according to the capacitance signal, controlling the antenna to switch from the first operation mode to a second operation mode in a case that the data of the distance comprises data of a distance smaller than or equal to a first threshold, wherein transmission power of the antenna in the second operation mode is smaller than transmission power of the antenna in the first operation mode.

2. The method according to claim 1, wherein generating the data of the distance between the operator and the antenna during the first time period according to the capacitance signal comprises:

obtaining the data of the distance corresponding to the capacitance signal from a preset correspondence between a capacitance and a distance, wherein the data of the distance comprises data of a distance between the operator and the antenna at any moment in the first time period.

3. A microcontroller, wherein the microcontroller is arranged in an electronic device, the electronic device comprises an antenna and a sensor, the antenna is connected to the sensor and is in a first operation mode, and the microcontroller is configured to:

obtain a capacitance signal which is generated by the antenna in the first operation mode during a first time period and is collected by the sensor;

generate data of a distance between an operator and the antenna during the first time period according to the capacitance signal;

analyze the data of the distance and obtain a movement trajectory of the operator formed during the first time period; and trigger the electronic device to make the electronic device execute a target instruction corresponding to the movement trajectory according to a preset correspondence between a trajectory and an instruction after the data analyzing module obtains the movement trajectory of the operator formed during the first time period, wherein the microcontroller is further configured to control the antenna to switch from the first operation mode to a second operation mode in a case that the data of the distance comprises data of a distance smaller than or equal to a first threshold after the data generating module generates the data of the distance between the operator and the antenna during the first time period according to the capacitance signal, wherein transmission power of the antenna in the second operation mode is smaller than transmission power of the antenna in the first operation mode.

4. The microcontroller according to claim 3, wherein generating data of the distance between the operator and the antenna during the first time period according to the capacitance signal the data generating module comprises:

obtaining the data of the distance corresponding to the capacitance signal from a preset correspondence between a capacitance and a distance, wherein the data of the distance comprises data of a distance between the operator and the antenna at any moment in the first time period.

5. An electronic device, wherein the electronic device comprises an antenna, a sensor and a microcontroller, the sensor is arranged on an upper region of a display screen of the electronic device or on a hinge region of the electronic device;

the antenna is configured to generate a capacitance signal in a case that an operator is in a search range of the antenna and in a case that the antenna is in a first operation mode;

the sensor is configured to collect the capacitance signal generated by the antenna in the first operation mode during a first time period;

the microcontroller is configured to obtain the capacitance signal collected by the sensor, generate data of a distance between the operator and the antenna during the first time period according to the capacitance signal, analyze the data of the distance and obtain a movement trajectory of the operator formed during the first time period, and trigger the electronic device to make the electronic device execute a target instruction corresponding to the movement trajectory according to a preset correspondence between a trajectory and an instruction after obtaining the movement trajectory of the operator formed during the first time period; and the microcontroller is further configured to control the antenna to switch from the first operation mode to a second operation mode in a case that the data of the distance comprises data of a distance smaller than or equal to a first threshold, wherein transmission power of the antenna in the second operation mode is smaller than transmission power of the antenna in the first operation mode.

6. The electronic device according to claim 5, wherein the microcontroller comprises:

a signal obtaining unit, configured to obtain the capacitance signal collected by the sensor;

a data generating unit, configured to obtain the data of the distance corresponding to the capacitance signal from a preset correspondence between a capacitance and a distance, wherein the data of the distance comprises data of a distance between the operator and the antenna at any moment in the first time period; and a data analyzing unit, configured to analyze the data of the distance and obtain the movement trajectory of the operator formed during the first time period.

* * * * *